(12) United States Patent
Blaicher et al.

(10) Patent No.: US 8,239,343 B2
(45) Date of Patent: Aug. 7, 2012

(54) DATABASE REORGANIZATION TECHNIQUE

(75) Inventors: Christopher Y. Blaicher, Austin, TX (US); Donald W. Black, Round Rock, TX (US); Mary D. Black, legal representative, Round Rock, TX (US)

(73) Assignee: BMC Software, Inc., Houston, TX (US)

( * ) Notice: Subject to any disclaimer, the term of this patent is extended or adjusted under 35 U.S.C. 154(b) by 1243 days.

(21) Appl. No.: 10/446,276

(22) Filed: May 23, 2003

(65) Prior Publication Data

US 2004/0236743 A1   Nov. 25, 2004

(51) Int. Cl.
*G06F 7/00* (2006.01)

(52) U.S. Cl. .................. 707/609; 707/790

(58) Field of Classification Search ......... 707/7, 104.1, 707/200, 100, 6, 3, 206, 10, 609, 790, 999.102
See application file for complete search history.

(56) References Cited

U.S. PATENT DOCUMENTS

| | | | |
|---|---|---|---|
| 5,625,815 A * | 4/1997 | Maier et al. | 1/1 |
| 5,640,554 A * | 6/1997 | Take | 1/1 |
| 5,761,667 A * | 6/1998 | Koeppen | 1/1 |
| 5,778,354 A * | 7/1998 | Leslie et al. | 707/715 |
| 5,842,207 A * | 11/1998 | Fujiwara et al. | 1/1 |
| 6,298,340 B1 * | 10/2001 | Calvignac et al. | 1/1 |
| 6,578,039 B1 * | 6/2003 | Kawamura | 1/1 |
| 6,778,977 B1 * | 8/2004 | Avadhanam et al. | 707/737 |
| 7,117,217 B2 * | 10/2006 | Ooi et al. | 1/1 |
| 7,158,996 B2 * | 1/2007 | Croisettier et al. | 707/741 |
| 7,212,817 B2 * | 5/2007 | Rozeboom et al. | 455/433 |
| 7,284,022 B2 * | 10/2007 | Kawamura | 1/1 |
| 7,363,325 B2 * | 4/2008 | Yianilos et al. | 1/1 |
| 2002/0029214 A1 * | 3/2002 | Yianilos et al. | 707/7 |
| 2004/0148293 A1 * | 7/2004 | Croisettier et al. | 707/100 |
| 2004/0220929 A1 * | 11/2004 | Rozeboom et al. | 707/6 |
| 2005/0050050 A1 * | 3/2005 | Kawamura | 707/100 |

* cited by examiner

*Primary Examiner* — Hosain Alam
*Assistant Examiner* — Eliyah S Harper

(57) ABSTRACT

A database reorganization technique uses multiple-coordinated read, sort and write tasks to substantially reduce the overall time to reorganize a database object. Coordination between the different functional tasks (e.g., read, sort and write tasks) is facilitated through the logical partitioning of the key values associated with the object to be reorganized. Object key values are determined by interrogating the object's associated database prior to initiating reorganization processing.

39 Claims, 4 Drawing Sheets

DATABASE REORGANIZATION TECHNIQUE

BACKGROUND

The invention relates generally to computer database systems and more particularly, but not by way of limitation, to methods and devices for reorganizing database files.

Databases may be characterized as comprising two types of "objects"—data objects and index objects. Both data and index objects are typically embodied as files stored on one or more direct access storage devices (DASDs). The process of reorganizing a database, then, generally involves reading a database object ("unloading"), passing the data to a sort utility that reorders (sorts) the data in accordance with a specified sort key and writing the data back to the object in a new sequence determined by the sort key ("reloading"). The needs for sorting are many and varied and are well-known to those of ordinary skill in the art of database system use and design. For example, periodic sorting of database objects can improve a user's response time during database search and retrieval operations.

A typical prior art technique for sorting a database object is shown in FIG. 1. Initially, prior art reorganization process 100 interrogates the targeted database to determine various structural and logical details needed to inform the sort operation (block 105). Illustrative details include, for example, the locations and names of the files in which the database data is physically stored and the identification and location of the sort key(s) within the targeted data. Next, reorganization process 100 obtains data records from the target database (block 110) and passes them to a sort routine (block 115). If additional records remain to be read from the target database (the "NO" prong of block 120), the acts of blocks 110 and 115 are repeated. If no additional records remain to be read (the "YES" prong of block 120), the sorted records are written back to the target database in their new (sorted) sequence (block 125). Following completion of write-back operations in accordance with block 125, the reorganization routine terminates (block 130).

One significant drawback to prior art database reorganization techniques is that for large databases consisting of hundreds of gigabytes to tens of terabytes, the time required to perform the read and write-back operations (e.g., blocks 110 and 125 in FIG. 1) can be significant. Thus, it would be beneficial to provide a technique to reorganize database objects that is more time efficient than current techniques.

SUMMARY

In one embodiment, the invention provides a method to reorganize a database object using multiple coordinated read, sort and write tasks. The method includes determining a key range for a database object, identifying two or more logical partitions for the database object (where each partition is associated with a different section of the determined key range), initiating a plurality of read tasks (where each read task is associated with a different physical portion of the database object), initiating a plurality of sort tasks (where each sort task is associated with at least one of the partitions) and initiating one or more write tasks for reloading the reorganized database object. Each read task obtains information having a key value (generically referred to as "data") from its associated portion of the database object and provides the data to that sort task associated with that partition that includes the key value. After the data is obtained and sorted, the one or more write tasks reload the sorted data back to the database. Methods in accordance with the invention may be used to reorganize an entire database, one object within a database (data or index) or two or more objects within a database (any combination of data and index objects). Methods in accordance with the invention may be stored in any media that is readable and executable by a programmable control device. In another embodiment, the invention provides a device for performing a database reorganization.

DETAILED DESCRIPTION

The invention relates generally to computer database systems and more particularly, but not by way of limitation, to methods and devices for reorganizing database files. Techniques in accordance with the invention use multiple, coordinated, read, sort and write tasks to unload, sort and reload a target database object. One benefit of a reorganization process in accordance with the invention is that it provides a substantial reduction in the start-to-finish time required to reorganize a database compared with prior art techniques.

Figure 1:
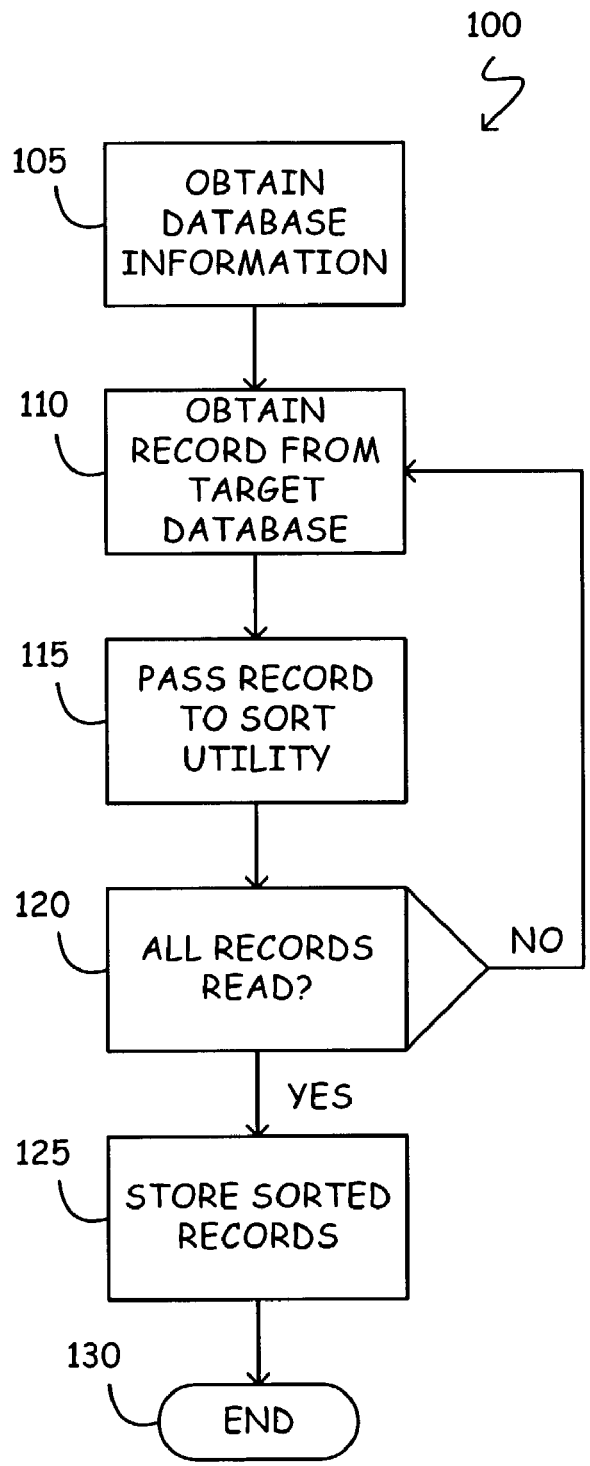
FIG. 1 shows a prior art database reorganization technique.
Figure 2:
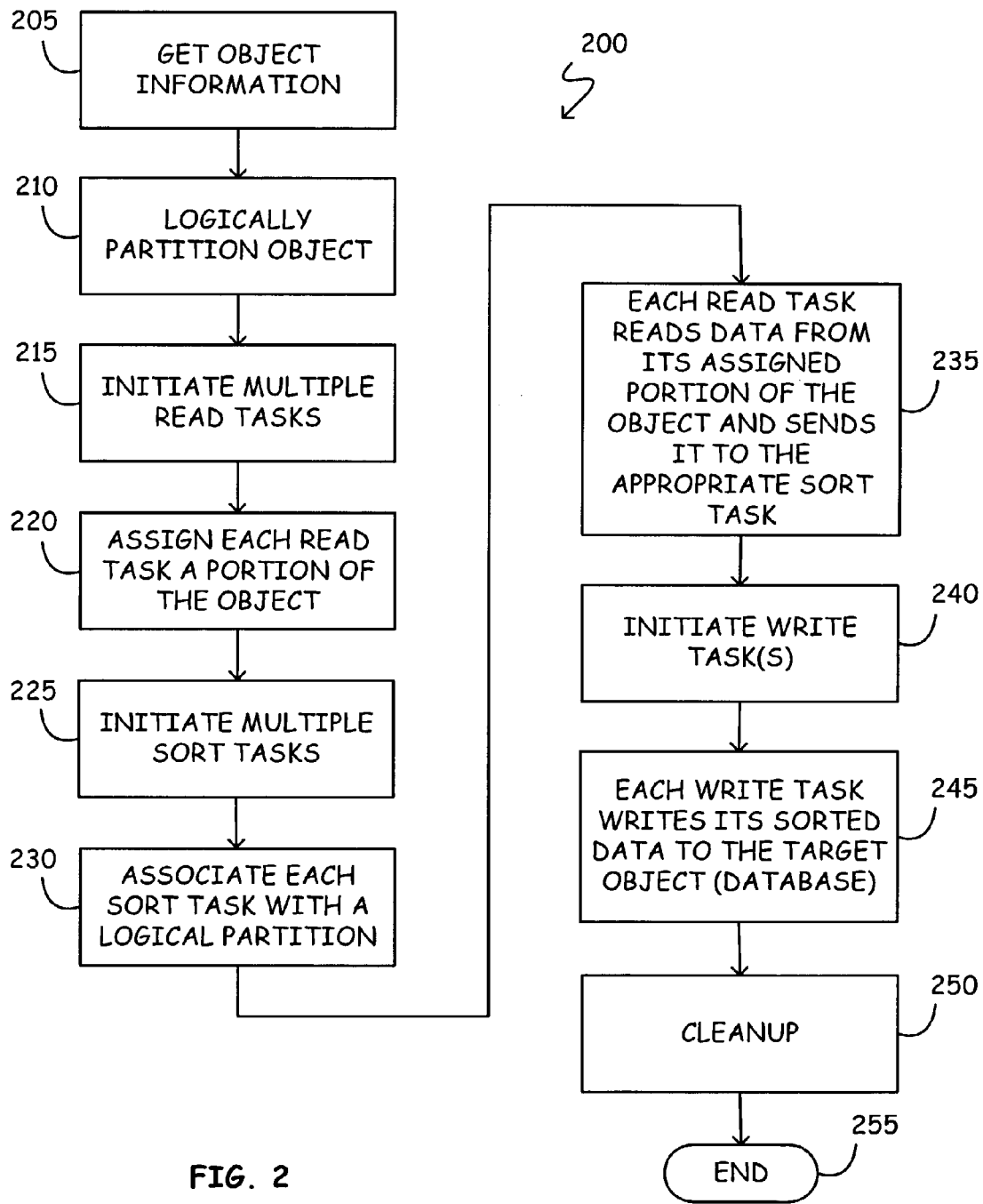
FIG. 2 illustrates, in flowchart form, one embodiment of a database reorganization process in accordance with the invention.

Referring to FIG. 2, reorganization process 200 in accordance with the invention can be used to reorganize one object within a database (e.g., a data object or an index object) or multiple objects within a database. Initially, reorganization process 200 interrogates a target database to obtain process control information for the object to be reorganized (block 205). For example, reorganization process 200 may query the target database's catalog to determine the structure of the object to be reorganized, the identity of fields within the stored object and which fields are indexed, the size and location of the stored data on DASD and an indication of the range of primary key values associated with the stored object. In addition, if the object being reorganized is a data object and not an index object, reorganization process 200 may also query the object's associated index object to obtain a more accurate indication of the range of primary key values associated with the stored data.

The database object to be reorganized is then logically divided into 'N' partitions based on the range of primary key values determined during the acts of block 205, where each partition includes a contiguous range of key values (block 210). For example, if the database object's primary key range is determined to be 000 to 999 and 'N' is two (2), a first partition may be defined by the 000-499 range of primary key values and a second partition may be defined by the 500-999 primary key values. Similarly, if 'N' equals four (4), partitions may be defined by the primary key value ranges of 000-249, 250-499, 500-749 and 750-999.

Once logically partitioned, two or more read tasks are initiated (block 215), where each read task is assigned to read a different portion of the object being reorganized (block 220). For example, if the acts of block 205 indicate the database object being reorganized is 100 Gigabytes (GB) in size and two (2) read tasks are initiated, then a first read task may be assigned to read from the "first" 50 GB of the object and a second read task may be assigned to read from the "second"

50 GB of the object. One of ordinary skill in the art will recognize that the acts of block 205, inter alia, identify the (likely, discontinuous) starting and stopping locations or addresses of the targeted object on DASD. Accordingly, the acts of block 220 assign each read task initiated in accordance with block 215 a different portion of the object from which to obtain information (e.g., "data" or 'index' information).

In addition, two or more sort tasks are initiated (block 225), where each sort task is associated with a different logical partition (block 230). For example, if the acts of block 210 divide the target data object's key range into two (2) partitions and two (2) sort tasks are initiated in accordance with block 225, the first sort task may be assigned to sort data (or indices) having key values included in the first partition and the second sort task may be assigned to sort data (or indices) having key values included in the second logical partition. Hereinafter, unless expressly noted otherwise, the term "data" includes both stored object data (i.e., information stored by a user) and stored index information.

Once initiated, read tasks obtain data from their assigned portion of an object (typically one record at a time) and pass the obtained data to the appropriate sort routine which then sorts its (block 235). For example, if a first read task reads a record from its assigned portion of the object and determines that the record's key value is XYZ, the read task will communicate that record to the sort task associated with the key range that includes the value XYZ.

After each read task has read all the records within its assigned portion of the object and passed those records to the appropriate sort routine, reorganization process 200 initiates one or more write tasks (block 240) to write-back or "reload" the sorted records to the target object (block 245).

On completion of the write-back process of block 245, reorganization process 200 may perform certain cleanup operations (block 250) prior to termination (block 255). Illustrative cleanup operations include, but are not limited to, releasing any access locks and closing all files associated with the target database object and/or database. In one embodiment, for example, if the object reorganized is a data (not an index) object, cleanup operations in accordance with block 250 may update the data object's associated index object to reflect its now-reorganized state.

Determination of an optimal or beneficial number of read, sort and write tasks to initiate in accordance with blocks 215, 225 and 240 requires precise knowledge of the user's computational environment. In particular, resources such as the amount of memory available for the reorganization process (volatile and nonvolatile), the number and speed of access paths to the data being reorganized and the particular overhead associated with running cooperating tasks or processes within a given environment must be considered. Tradeoffs between these factors will inform the decision maker as to how many of each task (read, sort and write) should be selected to optimize the reorganization process (e.g., minimize start-to-finish reorganization time). While complex, this task is within the ability of those having ordinary skill in the art of database system design, management and administration.

It is noted that the number of read, sort and write tasks initiated in accordance with the invention are independent of one another. Thus, in one embodiment the number of read tasks and the number of sort tasks are equal, with one sort task associated with each logical partition. In other embodiments, there are more or fewer read tasks than sort tasks, and more or fewer sort tasks than logical partitions. Similarly, the number of write tasks may be equal to, less than or greater than the number of sort tasks. It has been found that in some environments, matching the number of sort tasks and the number of write tasks (that is, associating one write task to one sort task during the operations of block 245) reduces DASD write-back conflicts.

One of ordinary skill in the art will recognize that the use of multiple read, sort and write tasks coordinated through the logical partition of a target data object's key range provides numerous advantages over prior art reorganization techniques. For example, the use of multiple coordinated read tasks can reduce the amount of time required to "unload" a target database object. Similarly, the use of multiple coordinated write tasks can reduce the amount of time required to "reload" the target database object once reorganized. It will further be recognized that use of multiple sort tasks, each associated with a unique range of data object key values, allows reorganization techniques in accordance with the invention to conveniently and efficiently distribute and coordinate the work performed by each of the multiple read and write tasks.

Figure 3:
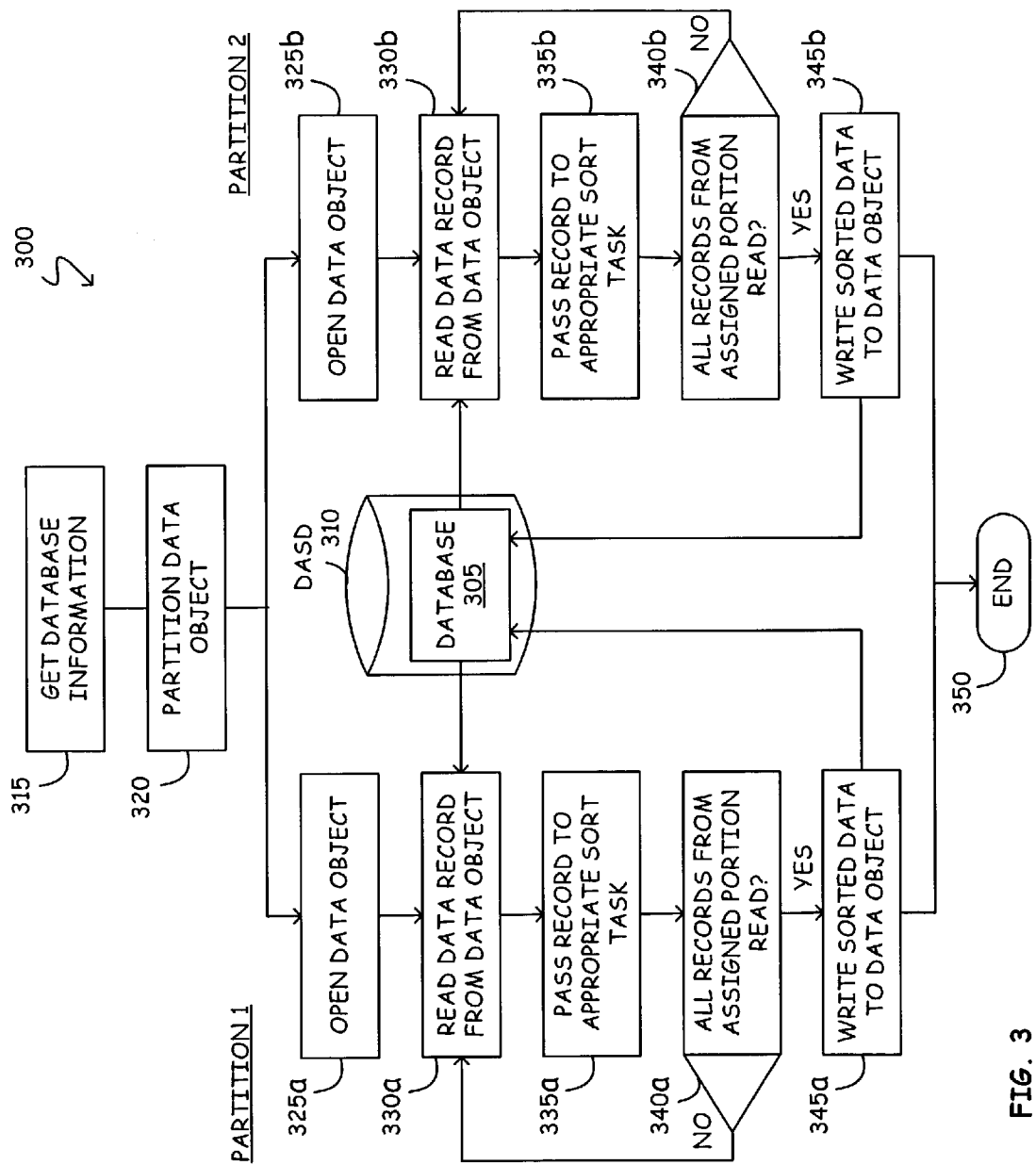
FIG. 3 illustrates, in flowchart form, another embodiment of a database reorganization process in accordance with the invention.

A specific embodiment of the invention directed to reorganizing a DB2® data object is shown in FIG. 3. (DB2 is a registered trademark of the International Business Machines corporation of Armonk, N.Y.) In the illustrated embodiment, reorganization process 300 interrogates DB2 database 305 on DASD 310 to identify the name, location and the range of primary key values (the "key range") associated with the data object to be reorganized (block 315). Next, the determined key range is divided into two (2) partitions with each partition associated with a continuous range of key values (block 320). For example, partition 1 may be associated with key values in the lower half of the determined key range, while partition 2 may be associated with key values in the upper half of the determined key range. Two read tasks are then initiated with each assigned a different portion of the data object. For example, if the target data object is determined (during the acts of block 315) to comprise 96 GB of data, 48 GB of this data may be assigned to each of the two read tasks.

Once initiated, each read task opens its assigned portion of the data object (blocks 325*a* and 325*b*), reads a single record (blocks 330*a* and 330*b*) and passes the record to the appropriate sort routine (blocks 335*a* and 335*b*)—that sort routine associated with the partition including the key value of the record. These actions are repeated until each read task has exhausted the records stored in its assigned portion of the data object (see blocks 340*a* and 340*b*). Sorted data are written back (i.e., "reloaded") into database 305 on completion of all sort operations (blocks 345*a* and 345*b*). In one embodiment, each sort task informs its associated write task how much space is required to store its sorted data records. In another embodiment, each read task informs the write tasks of the number of records it sent to each sort task and, based on an average record size, each write task can determine the approximate amount of DASD storage it needs. In either case, the write tasks reload the sorted data into database 305. Substantially concurrent with the write-back operation, write tasks may also update the index object in database 305 for the data object being reorganized (see blocks 345*a* and 345*b*). On completion of the write-back operation, reorganization process 300 terminates (block 350).

Figure 4:
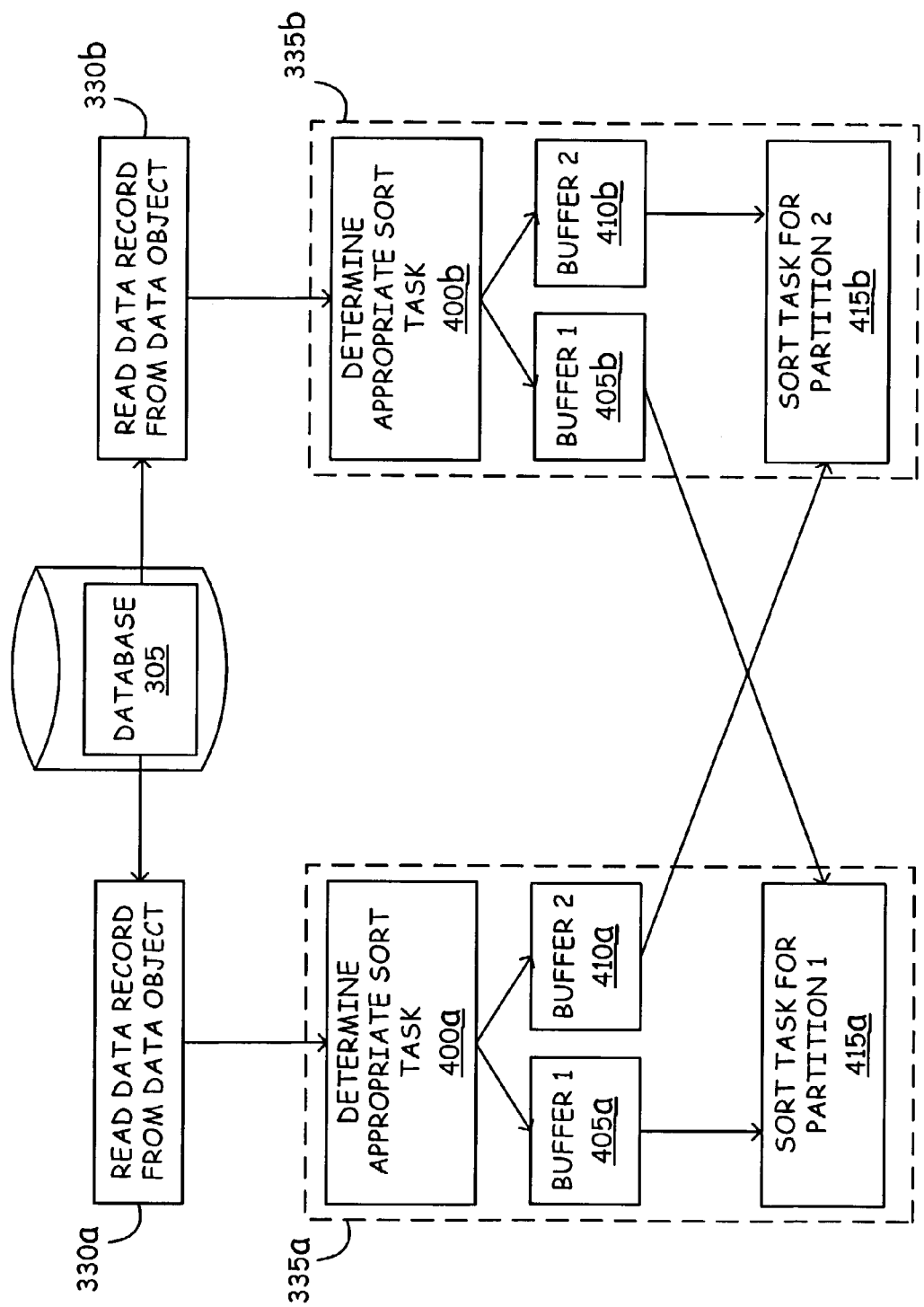
FIG. 4 illustrates, in flowchart form, a feature of the embodiment of FIG. 3.

Referring now to FIG. 4, each read task initiated by the process of FIG. 3 will generally have a buffer for each initiated sort task. Accordingly, during operation a read task reads a record from database 305 (blocks 330*a* and 330*b*), determines which sort task it should go to (blocks 400*a* and 400*b*) and places the record in the appropriate buffer (405*a*, 410*a*, 405*b* and 410*b*). Records are transferred from a read tasks' buffers to the appropriate sort tasks (415*a* and 415*b*) only when a buffer is filled or when the read task completes reading records from its assigned portion of the data object. Within the context of large database management systems and, DB2 in particular, it will be recognized by those of ordinary skill in the art that E15 exit programs may be used to pass data into a sort task and that E35 exit programs may be used to pass data from a sort task to a write task.

It will be recognized and understood that many modern databases such as DB2 may be "partitioned," which is to say that data associated with key ranges may be located in different data sets. The present invention treats each such partition as an independent object. Thus, partitions in accordance with the invention may or may not match the partitioning of a data object as used in contemporary databases such as, for example, DB2.

While the embodiments described herein have assumed the object being reorganized resided on a single DASD, the invention is not so limited. For example, a target object may span a number of different storage media and may further be distributed to physically disparate locations.

Various changes in the details of the illustrated operational methods are possible without departing from the scope of the following claims. For instance, acts in accordance with FIGS. 2-4 may be performed in an altered order and/or embodied in program instructions for execution by a programmable control device. A programmable control device may be a single computer processor, a plurality of computer processors coupled by a communications link, or a custom designed state machine. Storage devices suitable for tangibly embodying program instructions include, but not limited to: magnetic disks (fixed, floppy, and removable) and tape; optical media such as CD-ROM disks; and semiconductor memory devices such as Electrically Programmable Read-Only Memory (EPROM), Electrically Erasable Programmable Read-Only Memory (EEPROM), Programmable Gate Arrays and flash devices.

While the invention has been disclosed with respect to a limited number of embodiments, numerous modifications and variations will be appreciated by those skilled in the art. It is intended, therefore, that the following claims cover all such modifications and variations that may fall within the true sprit and scope of the invention.

What is claimed is:

1. A computer programmed to perform a database reorganization method, comprising:
   determining a key range for a database object in a database, said key range comprising a plurality of consecutive non-overlapping sets of key values, each set of key values referred to as a partition;
   identifying a plurality of non-overlapping portions for the database object;
   initiating a plurality of read tasks, each read task associated with a single database object portion;
   initiating a plurality of sort tasks, each sort task associated with at least one partition and more than one read task, wherein each read task acquires data having a key value from the associated database object portion and provides the acquired data to that sort task associated with the partition including the acquired key value; and
   writing the data sorted by the plurality of sort tasks to the database object in the database.

2. The computer of claim 1, wherein the act of determining a key range performed by the computer comprises reading a catalog associated with the database to determine a range of key values associated the database object.

3. The computer of claim 2, wherein the method performed by the computer further comprises reading an index object associated with the database to determine a range of key values associated with the database object.

4. The computer of claim 1, where in the method performed by the computer the key range comprises a range of values for a primary key of the database object.

5. The computer of claim 1, wherein the method performed by the computer the entire determined key range is spanned by the plurality of partitions.

6. The computer of claim 1, wherein the method performed by the computer each of the plurality of sort tasks are associated with a contiguous range of non-overlapping key values.

7. The computer of claim 6, wherein the method performed by the computer the entire determined key range is spanned by the plurality of sort tasks.

8. The computer of claim 1, wherein the method performed by the computer the number of sort tasks equal the number of identified partitions.

9. The computer of claim 1, wherein the method performed by the computer the number of sort tasks is less than the number of identified partitions.

10. The computer of claim 1, wherein the act of writing performed by the computer is performed by a plurality of write tasks.

11. The computer of claim 10, wherein the method performed by the computer the number of write tasks is equal to the number of sort tasks.

12. The computer of claim 10, wherein the method performed by the computer the number of write tasks is less than the number of sort tasks.

13. The computer of claim 1, wherein the act of writing performed by the computer comprises updating a catalog object associated with the database.

14. The computer of claim 13, wherein the act of writing performed by the computer further comprises updating an index object associated with the database.

15. The computer of claim 1, wherein the method performed by the computer the database comprises a DB2 database.

16. The computer of claim 1, wherein the method performed by the computer the database object comprises a data object of the database.

17. The computer of claim 1, wherein the method performed by the computer the database object comprises an index object of the database.

18. The computer of claim 1, wherein the method performed by the computer the database object comprises a data object and an index object of the database.

19. A program storage device, readable by a programmable control device, comprising instructions stored on the program storage device for causing the programmable control device to perform the method of claim 1.

20. The program storage device of claim 19, wherein the instructions to initiate a plurality of sort tasks comprise instructions to associate each of said plurality of sort tasks with a contiguous range of non-overlapping key values.

21. The program storage device of claim 19, wherein the instructions to write comprise instructions to initiate a plurality of write tasks.

22. The program storage device of claim 21, wherein the instructions to initiate a plurality of write tasks comprise instructions to initiate a number of write tasks equal to the number of sort tasks.

23. The program storage device of claim 19, wherein the instructions to write comprise instructions to update a catalog object associated with the database.

24. The program storage device of claim 23, wherein the instructions to write further comprise instructions to update an index object associated with the database.

25. The program storage device of claim 19, wherein the instructions to read, sort and write the database object comprise instructions to read, sort and write a data object of the database.

26. The program storage device of claim 19, wherein the instructions to read, sort and write the database object comprise instructions to read, sort and write an index object of the database.

27. The program storage device of claim 19, wherein the instructions to read, sort and write the database object comprise instructions to read, sort and write a data object and an index object of the database.

28. A database reorganization device, comprising:
memory for storing instructions and a database object in a database;
processor, communicatively coupled to the memory for executing the instructions of claim 19.

29. The database reorganization device of claim 28, wherein the memory comprises at least one direct access storage device.

30. The database reorganization device of claim 28, wherein the memory comprises volatile memory.

31. The database reorganization device of claim 28, wherein the processor comprises at least one central processing unit.

32. The database reorganization device of claim 28, wherein the instructions to initiate a plurality of sort tasks comprise instructions to associate each of said plurality of sort tasks with a contiguous range of non-overlapping key values.

33. The database reorganization device of claim 28, wherein the instructions to write comprise instructions to initiate a plurality of write tasks.

34. The database reorganization device of claim 21, wherein the instructions to initiate a plurality of write tasks comprise instructions to initiate a number of write tasks equal to the number of sort tasks.

35. The database reorganization device of claim 28, wherein the instructions to write comprise instructions to update a catalog object associated with the database.

36. The database reorganization device of claim 35, wherein the instructions to write further comprise instructions to update an index object associated with the database.

37. The database reorganization device of claim 28, wherein the instructions to read, sort and write the database object comprise instructions to read, sort and write a data object of the database.

38. The database reorganization device of claim 28, wherein the instructions to read, sort and write the database object comprise instructions to read, sort and write an index object of the database.

39. The database reorganization device of claim 28, wherein the instructions to read, sort and write the database object comprise instructions to read, sort and write a data object and an index object of the database.

* * * * *